Feb. 5, 1924.
V. LINK
1,482,935
COMBINATION SPRING END AND BUMPER SUPPORT
Filed Sept. 7, 1922
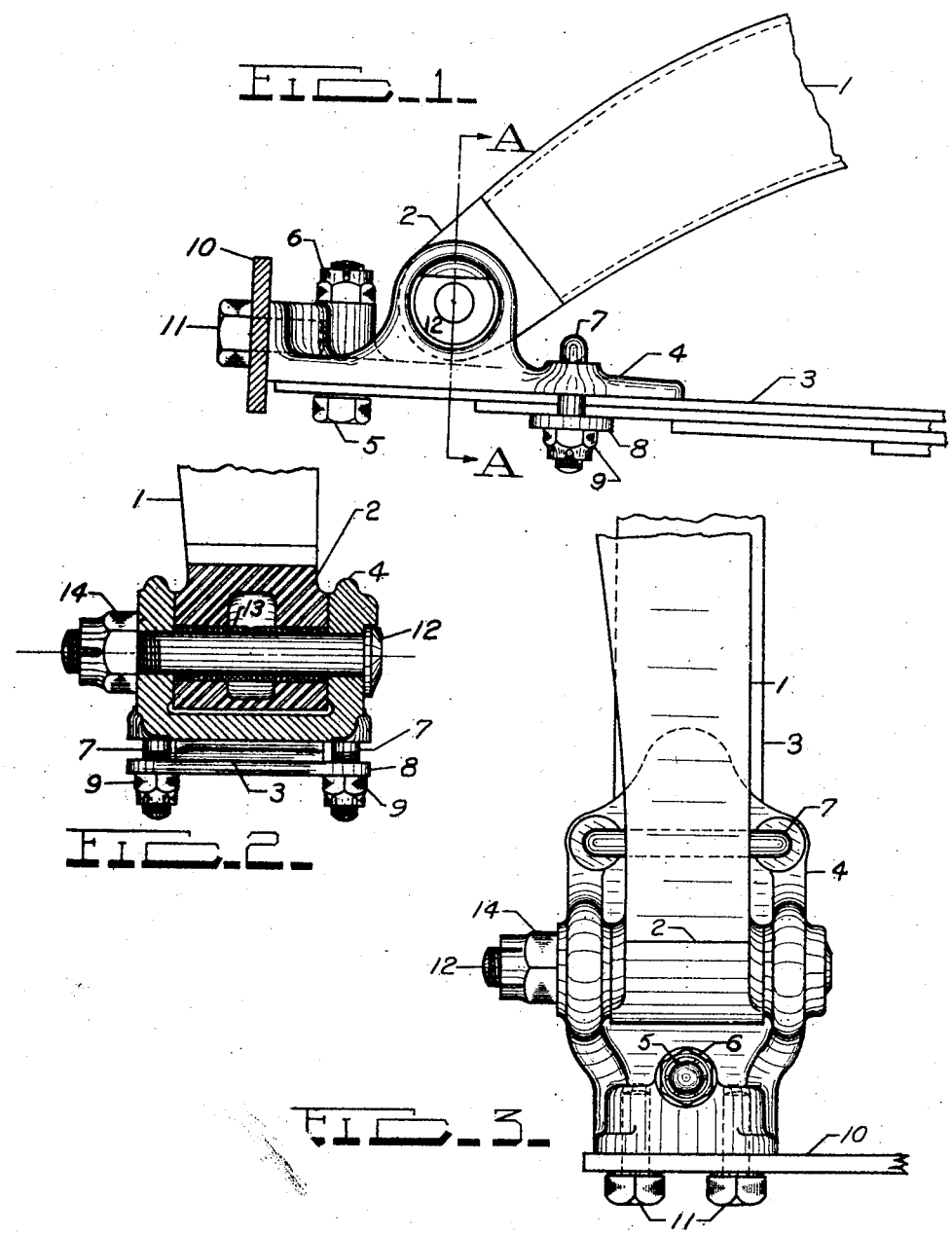
INVENTOR
VINCENT LINK
BY
William MacGlashan
ATTORNEY Patented Feb. 5, 1924.

1,482,935

UNITED STATES PATENT OFFICE.

VINCENT LINK, OF DETROIT, MICHIGAN, ASSIGNOR TO STUDEBAKER CORPORATION, A CORPORATION OF NEW JERSEY.

COMBINATION SPRING END AND BUMPER SUPPORT.

Application filed September 7, 1922. Serial No. 586,684.

*To all whom it may concern:*

Be it known that I, VINCENT LINK, a citizen of the United States of America, and resident of Detroit, in the county of Wayne and State of Michigan, have invented a certain new and useful Combination Spring End and Bumper Support, of which the following is a specification.

This invention relates to a combination spring end and bumper support for automobiles and has for its object the providing of a spring end that will eliminate the rolling and machining operations necessary with an integral spring eye, that will provide a spring end that, because of its small size and construction, may be easily, quickly and accurately machined, that will provide a built in bumper support without an increase in number of parts and which will not be unsightly in appearance when a bumper is not attached thereto.

As the protective value of a bumper is rapidly becoming universally recognized, it follows that sooner or later bumpers will become standard equipment on automobiles, as turned out by the manufacturer. In this event it is desirable to furnish means for attaching bumpers that will be simple, strong, economical to manufacture and that will necessitate the addition only of a minimum number of parts.

These being among the objects of my invention, the same consisting of certain features of construction and combination of parts to be hereinafter described and claimed with reference to the accompanying drawings which illustrate a suitable embodiment of my invention, having the above and other objects in view.

Figure 1 is a fragmentary side view of the end of an automobile frame side member and co-operating mechanism embodying my present invention, it being understood that one of such devices is used on each side of the automobile for mounting one bumper.

Figure 2 is a sectional view of the mechanism of Fig. 1 taken on the line AA of Fig. 1.

Figure 3 is a top view of the mechanism of Fig. 1.

Referring to the numbered parts of the drawing, 1 is the front end of an automobile frame side member, 2 is a frame eye member fastened to the end of the automobile frame side member 1, 3 is a multiple leaf spring; 4 is a spring end eye member separable from the spring 3 and fastened thereto by the bolt 5 and nut 6 and by the U bolt 7, clamping bar 8 and nut 9. A bumper 10 of which a small portion is shown is bolted to the spring end member 4 by the bolts 11. 12 is a spring bolt fastened in the spring end member 4 and journaling in the bushing 13 in the frame and eye member 2 and is held in place by the nut 14.

The spring end member 4 is preferably formed as a bracket having an extension adapted to seat on one of the leaves of the spring and be secured thereto by the bolt 5 and U-bolt 7. The spring end member is also provided with ears or projections at either side thereof between which the frame eye member 2 can be placed, after which the bolt 12 is inserted through the openings formed in the ears and eye frame member to form a pivotal connection therebetween.

The use of a separate spring end as shown at 4 provides a strong construction as well as one easy to machine on account of its small size, and by furnishing it with a pad or seat for a bumper it affords an admirable bumper support at a very small additional cost. Furthermore the use of a separate spring end member avoids the difficult operation of rolling up from the stock at the end of the spring a relatively small and accurate eye, which must be rolled and reamed before hardening and tempering, and whose dimensions are often caused to vary by the latter operation. The machining of the spring eye integral with the spring is especially slow and difficult because of the size of the object handled. By having the spring eye separable the work on the spring proper is reduced to cutting to length, punching and bending, allowing the eye member, requiring close work, to be allocated to the machine shop where it naturally belongs.

It also provides a construction whereby the bumper may be easily attached or detached, the removal of the two bolts 11 from each of the two spring end members 4 situated on the front of each of the two front springs or the rear of each of the two rear springs, allowing the removal of the bumper 10 without interfering with any other mechanism. The bumper 10 of which only a small portion is shown may be of any convenient form.

Formal changes may be made in the specific embodiment of the invention described without departing from the spirit or substance of the broad invention, the scope of which is commensurate with the appended claims.

What I claim is:

1. In an automobile having a spring suspension, a leaf spring having a separable spring end member rigidly attached thereto, said spring end member also forming a bumper support.

2. In an automobile, a spring end member and a spring rigidly secured thereto, said member also forming a support for a bumper.

3. In a device of the class described, a frame, a spring, and a connecting member pivotally connected to said frame and rigidly secured to said spring.

4. In a device of the class described, a frame, a laminated spring, one leaf of which has a flat end, and a member rigidly connected to the flat end of said spring and pivotally connected to said frame.

5. In a device of the class described, a laminated leaf spring, a bracket rigidly secured to said spring adjacent the end of said spring, a frame side member, a pivoted connection between said bracket and said frame side member, and a face on said bracket to receive a bumper.

6. In a device of the class described, a laminated leaf spring, a bracket having an extension forming a face adapted to be secured adjacent the end of said spring, a frame, and a pivoted connection joining said bracket to said frame.

7. In a device of the class described, a laminated spring, the leaves of which are of varying length and the longest leaf of which has a flat end, a bracket having a face secured to the flat end of said leaf, a frame side member, and a pivotal connection between said bracket and said frame side member.

8. In an automobile, a spring having a flat end, a bracket rigidly secured to said flat end of said spring, a frame side member, a pivotal connection between said bracket and said frame, a bumper, and a face formed on said bracket to which said bumper can be attached.

9. In an automobile, a spring having a flat end, a bracket having a face adapted to be secured to said flat end of said spring, a face formed on said bracket at substantially right angles to said first named face, said second named face being adapted to receive a bumper.

10. In an automobile, a spring having a flat end, a bracket having a face seating on said flat end of said spring and adapted to be secured thereto, a frame side member pivotally connected to said bracket, a face formed on said bracket at substantially right angles to said first named face, a bumper, and means to attach said bumper to said last named face on said bracket.

11. In an automobile, a frame side member, a laminated leaf spring having a portion extending beyond said frame side member, a bracket rigidly secured adjacent the end of said spring and pivotally secured to said frame side member, a face formed on the projecting portion of said bracket, a bumper, and means to attach said bumper to the face formed on said bracket.

Signed by me at Detroit, Michigan, U. S. A., this 5th day of September 1922.

VINCENT LINK.

Witnesses:
HODGSON S. PIERCE,
ELMER L. MCINTYRE.